United States Patent
Lawrence et al.

(10) Patent No.: US 7,411,991 B2
(45) Date of Patent: Aug. 12, 2008

(54) TUNABLE LASER

(75) Inventors: Brian Lee Lawrence, Clifton Park, NY (US); Marc Dubois, Clifton Park, NY (US); Robert John Filkins, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 262 days.

(21) Appl. No.: 10/815,907

(22) Filed: Mar. 31, 2004

(65) Prior Publication Data
US 2005/0226282 A1 Oct. 13, 2005

(51) Int. Cl.
*H01S 3/081* (2006.01)
(52) U.S. Cl. .............................. 372/93; 372/21; 372/22
(58) Field of Classification Search .................. 372/93, 372/21, 22
See application file for complete search history.

(56) References Cited

U.S. PATENT DOCUMENTS

| | | | | |
|---|---|---|---|---|
| 4,701,929 | A * | 10/1987 | Baer et al. | 372/71 |
| 5,260,953 | A * | 11/1993 | Rowe | 372/20 |
| 5,627,849 | A * | 5/1997 | Baer | 372/31 |
| 6,047,010 | A * | 4/2000 | Makio et al. | 372/22 |
| 6,295,305 | B1 * | 9/2001 | Matsumoto et al. | 372/19 |
| 2003/0086466 | A1 * | 5/2003 | Cox et al. | 372/93 |

OTHER PUBLICATIONS

J, Saikawa et al "Volume Holograpic Memories by Using Tunable Frequency-Doubled ND-YAG Microchip Laser", 1999 WEE, pp. 1179-1180.*

J. Saikawa, et al "Volume Holographic Memories by Using Tunable Frequency-Doubled Yb-YAG Microchip Laser", 1999 IEEE, pp. 1179-1180.

T. Taira, et al., Diode-Pumped Tunable Yb:YAG Miniature Lasers at Room Temperature: Modeling and Experiment, 1997 IEEE Journal of Selected Topics in Quantum Electronics, vol. 3, No. 1, Feb. 1997, pp. 100-104.

W. Culshaw, et al, Efficient Frequency-Doubled Single-Frequency Nd:YAG Laser, IEEE Journal of Quantum Electronics, Vo. QE-10, No. 2, Feb. 1974, pp. 253-263.

* cited by examiner

*Primary Examiner*—Minsun Harvey
*Assistant Examiner*—Tod T Van Roy
(74) *Attorney, Agent, or Firm*—Shawn A. McClintic

(57) ABSTRACT

Embodiments of methods, apparatuses, devices, and/or systems for a tunable laser are described. An apparatus includes: a tunable laser cavity including at least three mirrors, at least one filter and a plurality of crystals, wherein the three mirrors are substantially arranged in a lambda configuration, the filter includes a birefringent filter and an etalon, at least one of the crystals comprises a Cologuiriite crystal, and at least one other of the crystals comprises a nonlinear crystal, wherein the mirrors, the filter, and the plurality are configured for providing electromagnetic radiation of an approximately single frequency; and at least one electromagnetic radiation source being coupled to the laser cavity, wherein the electromagnetic radiation source is capable of providing electromagnetic radiation having an approximately particular wavelength to the laser cavity.

14 Claims, 2 Drawing Sheets

TUNABLE LASER

BACKGROUND

Figure 1:
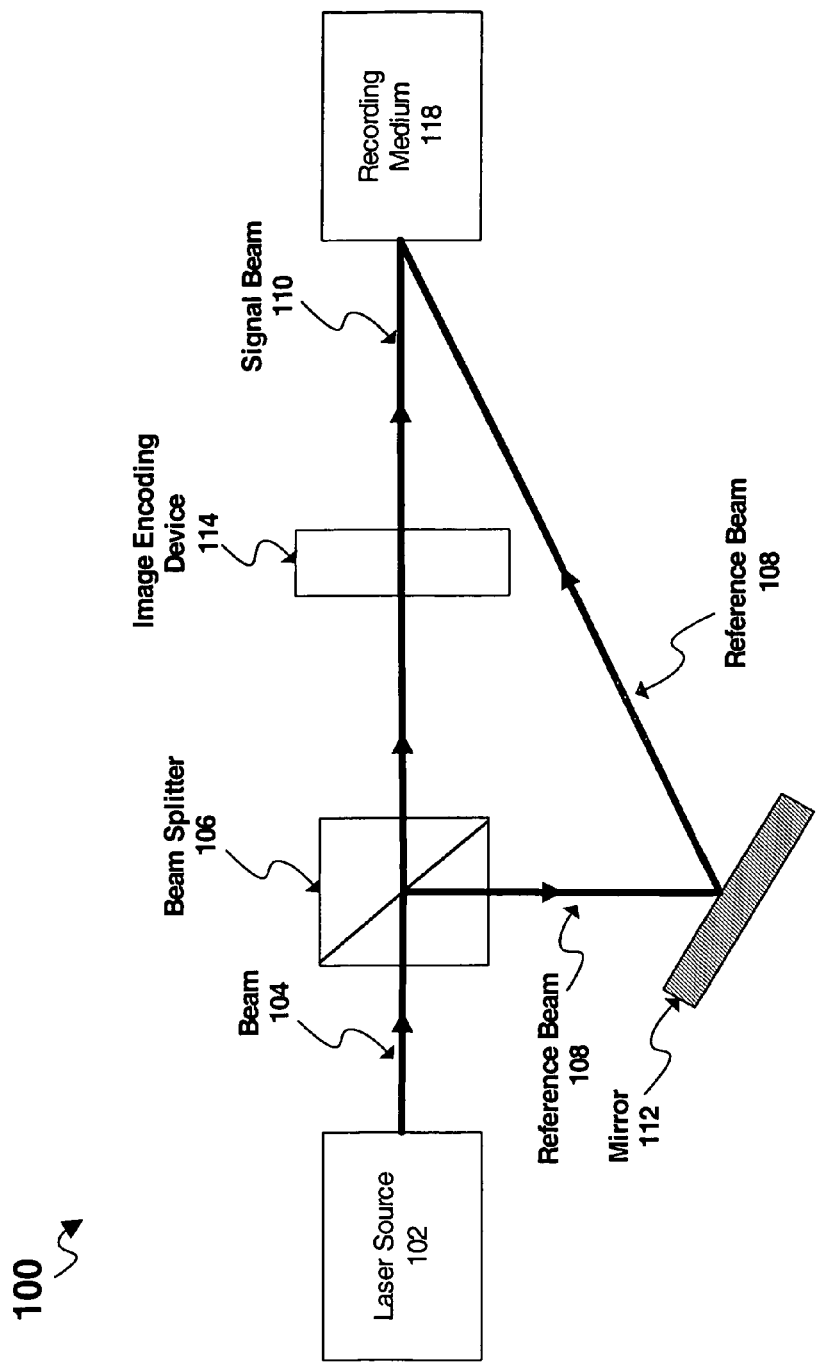

Advances in computing technology have resulted in the need for continual improvements in electronic data storage technology. Particular electronic data storage technology may include, for example, optical, magnetic, and/or magneto-optic technology. Optical data storage technology may have particular advantages as compared to other data storage technologies, including large data storage capacities and inexpensive recording media, for example. However, due at least in part to the aforementioned advances in computing technology, as well as increased usage of digital data in particular industries such as the entertainment industry, for example, improvements in the data capacity and data transfer rate of current optical storage technology is desirable.

BRIEF DESCRIPTION

In accordance with one embodiment of the present invention, an apparatus, comprises: a laser cavity, wherein said laser cavity comprises at least three mirrors, at least one filter and a plurality of crystals, wherein said at least three mirrors are substantially arranged in a lambda configuration, said at least one filter comprises a birefringent filter and an etalon, at least one of said plurality of crystals comprises a Coloquiriite crystal, and at least one of said plurality of crystals comprises a nonlinear crystal, wherein said at least three mirrors, said at least one filter, and said plurality of crystals are configured for providing electromagnetic radiation of an approximately single frequency; and at least one electromagnetic radiation source being coupled to the laser cavity, wherein said at least one electromagnetic radiation source is capable of providing electromagnetic radiation having an approximately particular wavelength to said laser cavity.

In accordance with another embodiment of the present invention, a method of generating a laser beam comprises: providing energy to a first crystal, wherein said first crystal produces electromagnetic radiation in response to said provided energy; filtering at least a portion of the electromagnetic radiation produced by said first crystal; altering the wavelength of at least a portion of said filtered electromagnetic radiation by passing at least a portion of said filtered electromagnetic radiation through a second crystal two or more times; and providing an output laser beam, wherein said output laser beam comprises at least a portion of said altered electromagnetic radiation and at least a portion of said filtered electromagnetic radiation.

In accordance with another embodiment of the present invention, a laser system comprises: a laser source; two or more crystals, wherein one crystal comprises a laser crystal, and one crystal comprises a nonlinear crystal; at least three mirrors, substantially arranged in a lambda configuration; and one or more filters, said laser source, said one or more crystals, at least three mirrors and said one or more filters being configured such that said laser source is capable of producing electromagnetic radiation within a particular wavelength range, at least one of said two or more crystals being configured to alter one or more properties of said electromagnetic radiation, and at least one of said one or more filters being configured to filter at least a portion of the electromagnetic radiation altered by said two or more crystals, wherein the portion filtered is adjustable.

DRAWINGS

Figure 2:
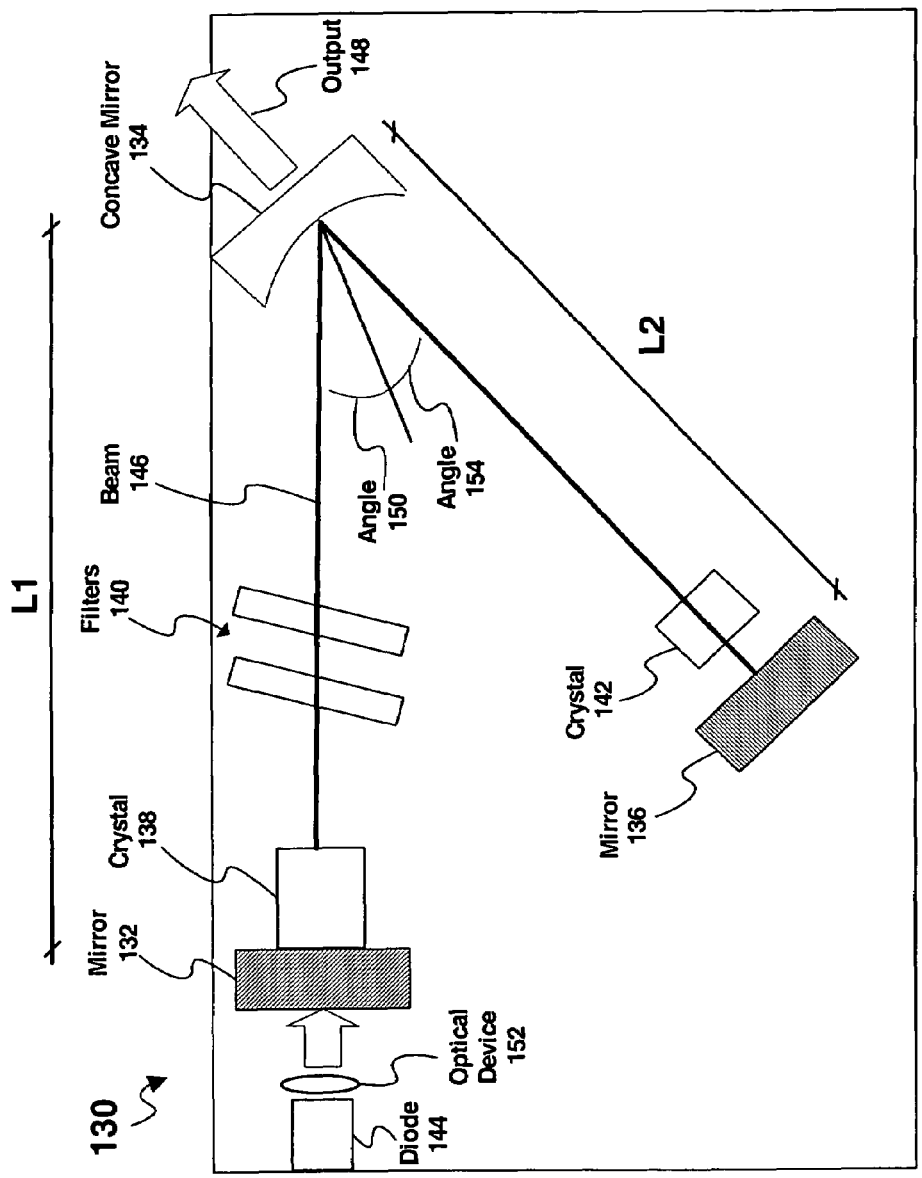

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 1 is a block diagram of an embodiment of a holographic data storage system; and FIG. 2 is a block diagram of one embodiment of a laser cavity.

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Electronic data storage technology, such as optical data storage, may provide improvements over other types of electronic data storage, for example. In one particular type of optical data storage technique, one or more laser sources are used to generate holograms, which may be used to store electronic data in a holographic recording medium, for example. Holographic data storage provides relatively high data density, and relatively short access times, especially as compared to current optical storage technologies. However, current techniques for holographic data storage have several limitations. Some of these limitations may, for example, include the selection and/or the configuration of a laser source for use in the holographic data storage system. As will be explained in more detail hereinafter, the laser source implemented in an optical data storage system may at least partially affect the capabilities of the optical data storage system, including data storage density, for example. Although the claimed subject matter is not so limited, in one particular embodiment, a laser source with particular output power, stability, and/or spectral characteristics, such as a laser source operating within at least a portion of the blue region of the visible spectrum, defined substantially as the wavelength range of approximately 375 nanometers (nm)-475 nm, may provide holographic data storage systems the potential to increase data densities and/or data transfer rates, for example.

Laser devices, such as solid-state laser devices, for example, have numerous scientific, industrial and/or medical applications. In one particular application, a laser device such as a solid-state laser device may be incorporated as part of a holographic data storage system. Holographic data storage systems typically utilize one or more laser sources, one or more laser beam modulators, and one or more types of photosensitive recording media operating in conjunction, to store holographic images representing bits of digital data, for example. Referring now to FIG. 1, there is illustrated one embodiment of a holographic data storage system. Illustrated in FIG. 1 is holographic data storage system embodiment 100, which comprises a radiation source, such as laser source 102. Laser source 102 may comprise a coherent laser source, for example, and may be configured to produce electromagnetic radiation, such as a laser beam 104. Beam 104 may strike a beam splitter 106, which may comprise a diffractive optical or other type of beam splitter, for example. After striking beam splitter 106, beam 104 may subsequently be split into multiple beams, here illustrated as reference beam 108, and signal beam 110, for example. Reference beam 108 may be collimated by a collimator (not shown), for example, and may be directed towards one or more mirrors, such as mirror 112, for example. Mirror 112 may be configured to direct reference beam 108 towards a particular location on recording medium 118, which may comprise a photosensitive recording medium, such as a photopolymer and/or inorganic crystal material, depending at least in part on the embodiment.

Conversely, signal beam 110 may be directed towards image encoding device 114. Image encoding device 114, in this embodiment, may comprise a spatial light modulator, which may be configured to selectively modulate light, such as by allowing light to pass through particular regions of the modulator, and not pass through other regions, for example. In one embodiment, a spatial light modulator comprises multiple arrays of pixels, wherein the pixels may be capable of being modulated to allow or not allow light to pass through, for example. In this embodiment, pixels of the spatial light modulator may at least partially modulate the beam 110 such as by allowing light to either pass through or not pass through one or more locations of the arrays, in order to represent binary '1' or '0' data bits, for example. In at least one embodiment, image-encoding device 114 may comprise a liquid crystal device, configured to modulate one or more pixels in order to represent digital bits of data, for example. Signal beam 110 may be at least partially modulated, and the at least partially modulated signal beam may be projected towards recoding medium 118. Reference beam 108 and signal beam 110 may be projected such that they at least partially intersect and/or interfere at a particular location on recording medium 118, for example. The resultant intersection of beam 108 and beam 110 may result in an interference pattern of light being produced, which may be projected on to a photosensitive recording medium, and may alter the medium, thereby forming a recorded image in the medium, which may be referred to as a replica and/or a hologram, for example. In one embodiment, multiple holograms may be stored in a photosensitive recording medium, at one or more locations in or on the photosensitive medium, by producing physical and/or chemical changes in the photosensitive medium, for example. Retrieving one or more holograms and determining the data contained in the holograms may utilize one or more beams similar to beams 108 and 110, for example. It is desirable to note, however, that this is just one particular type of a holographic recording system, and the claimed subject matter is not limited to these recited elements or to only this particular embodiment of a method of operation.

Numerous different types of laser sources may be utilized in a holographic data storage system, including frequency converted solid-state lasers, and/or diode lasers, for example. Frequency converted solid-state lasers may utilize a particular laser source, such as Nd:YAG (neodymium-doped yttrium aluminum garnet), for example, resulting in the production of a laser of a particular frequency. Additionally, diode lasers may be incorporated into systems with varying cavity configurations, such as external cavity configurations and/or a configuration where the cavity is integrated into an electronic package, which may provide a compact laser source. These particular types of laser sources with particular cavity configurations may be utilized in a holographic data storage system, but may have particular limitations.

In one embodiment of the claimed subject matter, a tunable laser may comprise a laser source, such as laser source 102 of FIG. 1, for example, although the claimed subject matter is not limited to just a laser source for a holographic data storage system, for example. A laser source, for example, may be used in one or more scientific, industrial and/or medical applications, as stated previously. It is desirable to note that embodiments of a tunable laser in accordance with the claimed subject matter may have numerous applications, and the claimed subject matter is intended to include any presently known or later discovered application of a tunable laser. In at least one embodiment of a tunable laser, a laser cavity is incorporated which utilizes a multiple mirror design, such as in a frequency doubled configuration, which, in this context, refers generally to a laser cavity configuration wherein a laser source may pass through one or more components such as a crystal, resulting in a laser output frequency of approximately double the original laser source, as just an example. For example, in one particular type of frequency doubled configuration, a laser cavity comprises a plurality of mirrors arranged substantially in a folded linear cavity lambda configuration, which is a physical (standing wave) configuration of mirrors comprising three or more mirrors, wherein at least two of the mirrors are arranged at approximately equal and approximately opposite angles and approximately equidistant from at least a third mirror. A laser cavity having a folded linear cavity lambda configuration is illustrated in FIG. 2 and explained in more detail hereinafter.

Referring now to FIG. 2, there is illustrated a laser source in accordance with at least one embodiment, here, in a laser cavity 130. Laser cavity 130 comprises an electromagnetic radiation source, such as a laser diode 144. A laser diode, in this context, comprises a diode with an active light emitting region, and typically further comprises a cavity with one or more mirror devices, for example. A laser diode, such as laser diode 144, may be capable of generating electromagnetic radiation, such as a laser beam, for example. Although illustrated as being proximate to optical device 152 and mirror 132, alternatively, laser diode 144 may be located externally from laser cavity 130, for example, and may be configured to provide electromagnetic radiation by first providing electromagnetic radiation to one or more optical fibers, such as a fiber bundle (not shown), which comprises a bundle of two or more optical fibers, such as a bundle of multiple fibers, wherein the ends of the fibers may be bound together, for example. Additionally, laser cavity 130 may utilize one or more lenses (not shown) in addition to optical device 152, to direct electromagnetic radiation, for example. Laser cavity 130 may comprise an optical device 152, which may comprise one or more lenses, for example, and a mirror 132, which may comprise a flat mirror, for example. A crystal 138 may be located proximate to mirror 132, such as attached to one side of the mirror, for example. Although illustrated as a separate element in FIG. 1, it is desirable to note that mirror 132 may comprise a reflective coating, such as a dielectric coating, formed on one side of crystal 138, such as the outside facet, wherein the coating has an approximately particular reflectivity, for example. Laser cavity 130 may further comprise a mirror 136, which may additionally comprise a flat mirror and may be similar to mirror 132, for example, or, alternatively, may comprise a curved mirror, for example. Mirror 132 and mirror 136 may be approximately located at a particular location from a concave mirror 134, such as substantially equidistant, and approximately at particular angles 150 and 154, respectively, which may comprise approximately equal and opposite angles from the normal of concave mirror 134, and may comprise a lambda configuration, for example, although of course the claimed subject matter is not limited in scope in this respect. Laser cavity 130 may comprise multiple filters, which may comprise wavelength filters, for example, and a crystal 142, which may comprise an optical crystal, for example, and may be located proximate to mirror 136, for example.

In operation, laser diode 144 may be configured to generate electromagnetic radiation, such as a laser beam, within approximately a particular wavelength range, for example. Optical device 152, which may comprise one or more lenses, may be configured to focus electromagnetic radiation from laser diode 144, such as towards crystal 138, for example. Electromagnetic radiation provided by laser diode 144 may be directed either through free space to optical device 152 as illustrated, or may be directed by use of one or more optical fibers and/or one or more additional lenses, as explained previously. Electromagnetic radiation generated by diode 144 may at least partially pass through mirror 132, and may be provided to crystal 138. In this context, providing electromagnetic radiation from laser diode 144 to crystal 138 may be referred to as laser pumping or optical pumping, for example. Electromagnetic radiation provided by the diode 144 may excite one or more atoms of crystal 138, which may additionally be referred to as a lasing crystal. The excitation of one or more atoms of crystal 138 may result in the production of a beam of laser light of approximately a particular wavelength range and of approximately a particular pulse duration, for example. The particular properties of a laser beam produced by crystal 138 may depend at least in part on the type of material and/or combination of materials comprising crystal 138, and may additionally depend at least in part on the form factor and/or dimensions of crystal 138. For example, in at least one embodiment, crystal 138 may comprise a Coloquiriite crystal, such as Cr:LiSAF (chromium-doped lithium strontium aluminum fluoride), Cr:LiSGAF (chromium-doped lithium strontium gallium aluminum fluoride), or Cr:LiCAF (chromium-doped lithium calcium aluminum fluoride), for example, and may have particular dimensions or a particular shape, such as rectangular or cylindrical, in order to produced a desired output beam, for example. Crystals of the Coloquiriite family may be selected at least in part to generate a broad gain region in approximately the 750 nm to 850 nm spectral region, for example, although the claimed subject matter is not so limited.

In this embodiment, mirror 132, which may comprise a dielectric mirror, and may comprise a coating formed on at least a portion of one surface of crystal 138, for example, may be configured to allow at least a portion of the electromagnetic radiation generated by diode 144 to substantially pass through, but may substantially reflect at least a portion of the electromagnetic radiation generated by crystal 138, for example, by having a reflectivity such that electromagnetic radiation within a substantially particular wavelength range is reflected, and electromagnetic radiation outside of that substantially particular range is not reflected, for example. Mirror 132 may substantially reflect at least a portion of the electromagnetic radiation produced by crystal 138, and result in an output laser beam 146 to be substantially reflected towards one or more filters, for example. Beam 146 may at least partially pass through one or more filters 140, which may be configured to filter at least a portion of the beam, such as substantially within one or more ranges of wavelengths of the electromagnetic spectrum, for example. In one embodiment, the filters may comprise three-plate quartz birefringent filters (BRF). These filters may be configured to operate substantially within a particular wavelength range, meaning, here, for example, that electromagnetic radiation of a substantially particular range of wavelengths will substantially pass through the filters. Additionally, filters 140 may comprise an etalon (not shown), which may be configured to narrow the beam 146, producing an output beam having a substantially particular line width, for example.

Beam 146 may substantially pass through filters 140 and the etalon, for example, and may strike mirror 134, for example. Depending at least in part on angles 150 and 154, lengths L1 and/or L2, and the configuration of mirror 134, for example, beam 146 may be substantially reflected towards mirror 136. Prior to striking mirror 136, beam 146 may substantially pass through crystal 142. Crystal 142 may comprise a nonlinear optical crystal, such as an angle-tuned lithium triborate (LBO) crystal, for example, which may be tuned by use of angle configuration and/or operating temperature, for example, to produce a desired output, such as phase matching of an incoming laser source, for example. Crystal 142 may be configured to modify one or more properties of beam 146. For example, crystal 142 may be configured to at least partially convert beam 146 to a beam having a wavelength of approximately half of its previous wavelength, or the second harmonic, as just an example. Of course, properties of a beam that are modified by a crystal such as an optical crystal and the amount of modification that occurs depends at least in part on the material and/or combination of materials comprising the crystal, and the claimed subject matter is not limited to a particular crystal wavelength. However, in this embodiment, beam 146 may strike mirror 136, which may be configured to substantially reflect both a substantially primary wavelength and a substantially second harmonic of the beam by having at least approximately a particular reflectivity, for example, and may reflect towards concave mirror 134, for example. The focal point of the beam reflected by mirror 136 may be located between mirror 136 and mirror 134, if, for example, mirror 136 is curved. For example, the focal point may be proximate to crystal 142, which may provide more efficient conversion of beam 146 to a beam having a wavelength of at least approximately half of its previous wavelength, as just an example. In this configuration, both the substantially primary wavelength and substantially second harmonic wavelengths of beam 146 may be reflected by mirror 136, such that at least a portion of the beam comprising such harmonics may make a subsequent pass through crystal 142. As a result of the subsequent pass, in one embodiment, the substantially second harmonic wavelength of beam 146 may be amplified through additional conversion of the substantially primary wavelength of beam 146, which may be referred to as optical parametric amplification, for example, and may result in the production of increased power in the substantially second harmonic wavelength of beam 146, as compared to a pass through crystal 142, for example. Continuing with this example, a laser beam having a substantially primary wavelength and a substantially second harmonic may be directed towards concave mirror 134, for example. Concave mirror 134 may be configured to allow the beam of the substantially second harmonic to pass at least partially through and not be reflected, and may substantially reflect at least a portion of the laser beam of the substantially primary wavelength, such as by having approximately a particular reflectivity, for example. In one embodiment, by allowing the beam of the substantially second harmonic wavelength to at least partially pass through, concave mirror 134 may increase the overall efficiency of laser cavity 130 by inhibiting at least a portion of the second harmonic wavelength from being substantially reflected, subsequently incident on laser crystal 132, and subsequently substantially absorbed by the laser crystal. Said absorption may result in a decrease in the power of the beam of the substantially second harmonic wavelength, as well as heating of the laser crystal, which may reduce efficiency of the laser crystal, as just a few examples. The laser beam that substantially passes through mirror 134 may comprise output beam 148, for example, and may comprise a laser beam of a substantially particular wavelength, such as a laser beam with a wavelength of substantially half the wavelength, or the second harmonic, of the beam produced by crystal 138, for example, and may comprise a beam having an increased power as compared to a beam that is passed through an optical crystal, for example.

In one example embodiment, a laser source comprises a laser cavity, such as laser cavity 130. In this embodiment, the laser cavity comprises a laser diode configured to produce electromagnetic radiation substantially within a particular wavelength range, such as a laser beam with a spectral output approximately within the range of approximately 660 nm to approximately 680 nm, such as approximately 670 nm. The laser diode, in this embodiment, may be further configured to provide said radiation into an optical fiber bundle, wherein the bundle has a diameter approximately in the range of approximately 100-1000 microns. In this embodiment, the laser cavity further comprises an optical system configured to direct at least a portion of the electromagnetic radiation produced by the diode and provided to the optical fiber to a first crystal. The first crystal, in this embodiment, comprises a Coloquiriite crystal, having a broad gain region approximately in the spectral region of approximately 750 nm to approximately 850 nm spectral region, meaning, for example, that the crystal may be capable of producing a laser beam approximately within the range of approximately 750 nm to approximately 850 nm if provided with adequate energy, such as from another electromagnetic radiation source, for example. As is well-known, a particular wavelength range of a laser beam such as this is approximately in the red to near infrared region of the electromagnetic spectrum. A first mirror may be coated on at least a portion of one side of the first crystal, such as on the outside facet, for example, and may be configured to allow electromagnetic radiation from the diode to substantially pass through, but may substantially reflect radiation generated by the crystal, such as by having a substantially particular reflectivity. For example, the first mirror may have a reflectivity wherein a laser beam with a wavelength of approximately 670 nm is not reflected, but a laser beam having a wavelength approximately within the range of approximately 750 nm to approximately 850 nm is at least partially reflected, for example, and may be reflected towards a filter. The filter, in this embodiment, may comprise a three-plate quartz birefringent filter and an etalon, oriented such that a laser beam substantially within a particular wavelength range and having a substantially particular line width substantially passes through the filters. In this particular embodiment, for example, a laser beam with a wavelength approximately within the range of approximately 750 nm to approximately 850 nm may be produced by the first crystal and provided to the filters, and the filters may allow a laser beam of a smaller wavelength range to pass through the filters, such as a laser beam having a wavelength of approximately 758 nm to approximately 760 nm, for example, with a line width of approximately 1 nm, for example. Additionally, the filters may allow a laser beam of an approximately single wavelength to pass though, thereby producing a laser source with an approximately single axial mode or approximately single wavelength, as explained in more detail later.

The laser cavity may further comprise a second mirror, which may be configured to direct a laser beam towards a second crystal, and may comprise a concave mirror with a substantially particular radius of curvature, for example. Second mirror may have approximately a particular reflectivity, and may be configured to reflect a laser beam of one or more particular wavelengths, and may be configured to not reflect a laser beam of other approximate wavelengths, for example. Second crystal may comprise an angle and/or temperature tuned nonlinear optical crystal, such as an angle and/or temperature tuned lithium triborate crystal. The second crystal, in this embodiment, may be configured to convert a laser beam having an approximately particular wavelength at least partially to laser beam having another approximate wavelength. For example, in this embodiment, the second crystal may be configured to convert a laser beam to a laser beam having approximately half the wavelength, also referred to as electromagnetic radiation of the second harmonic, for example. A third mirror may be located proximate to the second crystal, and may, similarly to the first mirror, be configured to substantially reflect a laser beam of approximately one or more particular wavelengths, such as by having approximately a particular reflectivity, for example. In this embodiment, the second crystal may convert a laser beam provided by the first crystal and filtered by the filter to a laser beam of approximately half the wavelength. For example, if a laser beam having a wavelength within the range of approximately 758 nm to 760 nm substantially passes through the filters, the second crystal may be configured to convert at least a portion of the laser beam to a laser beam having a wavelength approximately within the range of approximately 379 nm to 380 nm, for example. The third mirror may reflect at least a portion of the laser beam having approximately half the wavelength through the second crystal, such that the laser beam makes a subsequent pass through the second crystal. As a result of the subsequent pass, the substantially second harmonic wavelength of the laser beam may be amplified through additional conversion of the substantially primary wavelength of the laser beam, referred to generally as optical parametric amplification. This may result in the production of increased power in the substantially second harmonic wavelength of the laser beam as compared to a pass through the second crystal, for example. The laser beam may be reflected through the second crystal a second time, and may be substantially reflected towards the second mirror. The concave mirror may, due at least in part to the mirror reflectivity, allow at least a portion of the laser beam having approximately half the wavelength to substantially pass through, resulting in an output laser beam wherein the laser beam has a wavelength of approximately half of the wavelength of the laser beam passing through the filters. By allowing the beam of half the wavelength to pass through, the concave mirror may increase the overall efficiency of the laser cavity by resulting at least a portion of the beam of at least approximately half the wavelength to not be substantially reflected, subsequently incident on the first crystal, and subsequently substantially absorbed by the first crystal. Said absorption may result in a decrease in the power of the beam of approximately half the wavelength, as well as heating of the first crystal, which may reduce efficiency of the crystal, for example. In this particular configuration, a laser output beam provided in this manner may comprise a laser beam substantially within the blue region of the electromagnetic spectrum, thus comprising a tunable blue laser source. Additionally, in this particular configuration, power output may be approximately within the range of 10 milliwatts to 50 milliwatts, for example, and may comprise a laser beam with an increased power output as compared to a laser generated by use of a laser cavity wherein the laser cavity is not in a lambda configuration, for example.

In at least one embodiment, the output beam of a laser cavity, such as cavity 130, may be adjusted to have an approximately particular wavelength or be approximately within a particular wavelength range. In this embodiment, an adjustment may be made by altering the orientation of one or more filters. For example, by altering the orientation of one or more of the filters, a laser beam of an approximately particular wavelength or wavelength range may pass through the filters. Depending at least in part on the type of material and/or combination of materials comprising the filters, the number of filters, and/or the particular configuration of the filters, for example, alterations may be possible wherein a laser beam passing through the filters may comprise a laser beam of an approximately single wavelength or of a single axial mode, and altering one or more properties of one or more filters may result in a laser beam of a differing wavelength, such as a laser beam of an approximately particular wavelength substantially incrementally larger or smaller, may be allowed to substantially pass through the filters. This may result, for example, in an output laser beam wherein the output beam is adjustable with respect to the wavelength of the laser output signal, and adjustments may be on an approximately incremental basis, such as nanometer by nanometer, or fractions of a nanometer, for example. In the embodiment previously described, wherein a laser source generates a laser beam approximately within the wavelength range of 750 nm to 850 nm, and a resultant output beam may comprise a laser beam of approximately half of the source wavelength, an output laser beam of a relatively high power output, approximately within the range of 375 nm to 425 nm may be possible, and may be adjustable to approximately any wavelength within that particular range, such as approximately incrementally by nanometer, resulting in a range of adjustment of approximately 50 nanometers, for example, wherein the tunable laser is capable of operating in a single axial mode, for example.

In one embodiment of the claimed subject matter, a laser source, such as laser cavity 130 of FIG. 2, may be incorporated as part of a holographic data storage system, such as system 100 of FIG. 1. In this embodiment, holographic data storage operations may occur, and between one or more operations, particular adjustments may be made to the laser cavity, resulting in an output laser beam having an altered wavelength as compared to a previous output beam, for example. In this embodiment, adjustments may be made to one or more components of the laser cavity, such as adjustments to one or more filters, for example, resulting in an output beam of an approximately particular wavelength, or approximately within a particular wavelength range. Of course, although the claimed subject matter is illustrated in the context of holographic data storage, it is, of course, appreciated that numerous other types and/or categories of applications exist and/or may later be developed, and the claimed subject matter is, therefore, not limited to this particular embodiment.

It is, of course, now appreciated, based at least in part on the foregoing disclosure, that software and/or hardware may be produced capable of performing one or more of the above-described operations. It will, of course, also be understood that, although particular embodiments have just been described, the claimed subject matter is not limited in scope to a particular embodiment or implementation. For example, one embodiment may be in hardware, such as implemented to operate on a device or combination of devices, as previously described, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. An apparatus, comprising:
 a tunable laser cavity, wherein said laser cavity comprises at least three mirrors, at least one filter and a plurality of crystals, wherein
  said at least three mirrors are substantially arranged in a folded linear cavity lambda configuration,
  said at least one filter comprises a birefringent filter and an etalon, at least one of said plurality of crystals comprises a Coloquiriite crystal, and at least one of said plurality of crystals comprises a nonlinear crystal, wherein
  said at least three mirrors, said at least one filter, and said plurality of crystals are configured for providing electromagnetic radiation of an approximately single frequency; and
 at least one electromagnetic radiation source being coupled to the laser cavity, wherein said at least one electromagnetic radiation source is capable of providing electromagnetic radiation having an approximately particular wavelength to said laser cavity, wherein at least one of said plurality of crystals is configured to, in operation, alter one or more properties of said electromagnetic radiation provided by said electromagnetic radiation source,
 wherein said at least one filter is configured to filter at least a portion of the electromagnetic radiation altered by at least one of said plurality of crystals, wherein the at least one filter is adjustable to tune the frequency of the electromagnetic radiation altered by the at least one of said plurality of crystals,
 wherein at least one filter comprises a quartz birefringent filter,
 wherein said quartz birefringent filter further comprises three plates of quartz birefringent.

2. The apparatus of claim 1, wherein said at least one electromagnetic radiation source comprises a laser diode.

3. The apparatus of claim 2, wherein said laser diode is capable of producing electromagnetic radiation with a wavelength of approximately 670 nanometers.

4. The apparatus of claim 1, wherein said apparatus is capable of providing electromagnetic radiation within approximately the blue region of the electromagnetic spectrum.

5. The apparatus of claim 1, wherein said nonlinear crystal is configured to convert at least a portion of said electromagnetic radiation of an approximately particular wavelength to radiation having approximately half said approximately particular wavelength.

6. The apparatus of claim 1, wherein said at least one of said plurality of crystals comprising the Coloquiriite crystal is capable of altering electromagnetic radiation so as to produce electromagnetic radiation at least approximately within a wavelength range of approximately 750 nanometers to approximately 850 nanometers, and wherein said at least one of said plurality of crystals comprising a nonlinear crystal comprises a lithium triborate crystal capable of altering electromagnetic radiation so as to produce electromagnetic radiation approximately within the range of approximately 375 nanometers to approximately 425 nanometers.

7. The apparatus of claim 1, wherein at least one of said plurality of mirrors comprises a dielectric mirror, wherein said dielectric mirror has at least approximately a particular reflectivity.

8. The apparatus of claim 1, wherein said quartz birefringent filter is capable of being adjusted by altering the orientation of one or more plates.

9. The apparatus of claim 1, wherein said filter is capable of being adjusted such that the wavelength of electromagnetic radiation substantially passing though the filter is altered by at least approximately fractions of a nanometer.

10. The apparatus of claim 1, wherein said apparatus is incorporated within a holographic data recording system, said holographic data recording system further comprising one or more photosensitive recoding mediums, said laser source being configured to, in operation:

provide one or more laser beams to said photosensitive recording medium; and form an image in said photosensitive recording medium.

11. A tunable laser system, comprising:

a laser source;

two or more crystals, wherein one crystal comprises a laser crystal, and one crystal comprises a nonlinear crystal;

at least three mirrors, substantially arranged in a folded linear cavity lambda configuration; and one or more filters, said laser source, said one or more crystals, said at least three mirrors and said one or more filters being configured such that said laser source is capable of producing electromagnetic radiation within a particular range, at least one of said two or more crystals being configured to alter one or more properties of said electromagnetic radiation, and at least one of said one or more filters being configured to filter at least a portion of the electromagnetic radiation altered by said two or more crystals, wherein the portion filtered is adjustable to tune the frequency of the electromagnetic radiation altered by said two or more crystals;

wherein at least two of said two or more crystals comprise at least a Coloquiriite crystal and a lithium triborate crystal, said Coloquiriite crystal being capable of absorbing electromagnetic radiation so as to produce electromagnetic radiation within a wavelength range of approximately 750 nanometers to 850 nanometers, and said lithium triborate crystal being capable of altering electromagnetic radiation so as to produce electromagnetic radiation approximately within the range of approximately 375 nanometers to 425 nanometers; and wherein said at least one of said one or more filters comprising three plates of quartz birefringent, wherein said quartz birefringent plates are capable of being adjusted by altering the orientation of one or more plates.

12. The laser system of claim 11, wherein said laser system is capable of producing electromagnetic radiation within approximately the blue region of the electromagnetic spectrum.

13. The laser system of claim 11, wherein said filter is capable of being adjusted such that the wavelength of electromagnetic radiation substantially passing though the filter is altered by approximately fractions of a nanometer.

14. The laser system of claim 11, wherein said laser system is incorporated within a holographic data recording system, said holographic data recording system further comprising one or more photosensitive recoding mediums, said laser system being configured to, in operation:

provide electromagnetic radiation to said photosensitive recording medium; and form an image in said photosensitive recording medium.

* * * * *